United States Patent [19]

Abel et al.

[11] Patent Number: 4,633,467

[45] Date of Patent: Dec. 30, 1986

[54] COMPUTER SYSTEM FAULT RECOVERY BASED ON HISTORICAL ANALYSIS

[75] Inventors: Mark J. Abel, Middleburg Heights, Ohio; Chi L. Kwan, Naperville, Ill.; Philip V. Polli, Elk Grove Village, Ill.; Michael T. Veach, Naperville, Ill.

[73] Assignee: AT&T Bell Laboratories, Murray Hill, N.J.

[21] Appl. No.: 634,461

[22] Filed: Jul. 26, 1984

[51] Int. Cl.$^4$ ............................................. G06F 11/16
[52] U.S. Cl. .......................................... 371/16; 371/9; 371/11
[58] Field of Search ................. 371/16, 11, 9; 364/200

[56] References Cited

U.S. PATENT DOCUMENTS

| | | | |
|---|---|---|---|
| 4,108,360 | 8/1978 | Beismann | 371/16 |
| 4,380,067 | 4/1983 | Beardsley | 371/11 |
| 4,438,494 | 3/1984 | Budde | 371/11 |
| 4,453,210 | 6/1984 | Suzuki | 371/16 |
| 4,503,535 | 3/1985 | Budde | 371/11 |
| 4,517,639 | 5/1985 | Ferrell | 371/9 |

OTHER PUBLICATIONS

"IBM Techical Disclosure", J. R. Keffler, vol. 16, No. 6, Nov. 1973, pp. 1903–1904.
"Proceedings of the IEEE", A. L. Hopkins et al. vol. 66, No. 10, Oct. 1978, pp. 1221–1239.

Primary Examiner—Jerry Smith
Assistant Examiner—Robert W. Beausoliel, Jr.
Attorney, Agent, or Firm—Jerry W. Herndon

[57] ABSTRACT

A method of identifying faulty units in a computer-controlled system. The system units generate error reports in response to the detection of error conditions. When an error report is received, an initial list is generated containing probable fault weights for each of the system units based on the type of the error report. The probable fault weights are prespecified based on a logical analysis of the fault modes and error propagation paths in the system. A history list of fault weights is first aged and then combined with the initial list to generate a resultant list. The resultant list becomes the new history list. The resultant list is then masked by the initial list to form a selection list from which a most probable fault unit is selected.

12 Claims, 11 Drawing Figures

FAULT WEIGHT TABLE

| ERROR NO. | CPU | MSCU | MMP | MICU | TMS | DLI |
|---|---|---|---|---|---|---|
| 1 | 0 | 50 | 10 | 15 | 15 | 10 |
| 2 | 5 | 30 | 40 | 15 | 10 | 0 |
| 3 | | | | | | |
| ⋮ | ⋮ | ⋮ | ⋮ | ⋮ | ⋮ | ⋮ |
| N | | | | | | |

FIG. 6

INITIAL FAULT PROBABILITY LIST
ASSUMING ERROR REPORT #2 AND PATH 6

| CPU 0 | MSCU 0 | MMP 0B | MICU 1 | TMS 1 | DLI 1 |
|---|---|---|---|---|---|
| 5% | 30% | 40% | 15% | 10% | 0% |

FIG. 7

HISTORY LIST

| MSCU 0 | MMP 0A | TMS 1 |
|---|---|---|
| 10% | 15% | 50% |

FIG. 8

AGED HISTORY LIST
ASSUMING 2 SECONDS SINCE LAST ERROR REPORT

| MSCU 0 | MMP 0A | TMS 1 |
|---|---|---|
| 0% | 5% | 40% |

FIG. 9

RESULTANT LIST

| CPU 0 | MSCU 0 | MMP 0A | MMP 0B | MICU 1 | TMS 1 | DLI 1 |
|---|---|---|---|---|---|---|
| 5% | 30% | 5% | 40% | 15% | 50% | 0% |

FIG. 10

SELECTION LIST

| CPU 0 | MSCU 0 | MMP 0B | MICU 1 | TMS 1 |
|---|---|---|---|---|
| 5% | 30% | 40% | 15% | 50% |

FIG. 11

MODULATION TABLE

| NO. OF MMP's IN SERVICE (X) | NO. OF ERROR REPORTS OF #AA FROM MMP's (Z) |
|---|---|
| 2 | 2 |
| 3 | 3 |
| 4 | 4 |
| 5 | 5 |
| 6 | 5 |
| ¦ | ¦ |

4,633,467

COMPUTER SYSTEM FAULT RECOVERY BASED ON HISTORICAL ANALYSIS

TECHNICAL FIELD

The invention pertains to computer system fault detection and recovery techniques in general and, in particular, to techniques for identifying faulty units in computer-controlled telephone switching systems.

BACKGROUND OF THE INVENTION

It is desirable automatically to identify faulty units in computer systems that involve many peripheral units as well as processors, memories, etc. Telephony is a good example of an art in which fault identification and automatic system recovery has been developed to a high degree of sophistication. System redundancy and automatic detection of system malfunctions have long been employed in switching systems to enhance system reliability, even in older electromechanical systems. Redundancy, immediate fault detection and unit reconfiguration have continued to be the mainstay of system reliability of the computer controlled switching offices of today.

Many techniques are known for identifying the source of a system malfunction. In general, however, these techniques are based on system recovery algorithms of reconfiguring the system and retrying the operation on which a malfunction occurred until a successful completion of the operation is achieved. If an algorithm is designed properly, the system is then able by a process of elimination to identify the offending (faulty) unit. While techniques such as these are workable in general, they sometimes have certain disadvantages. For example, some subsystems may have complex paths of communication in which any given unit may appear in more than one path. Depending on the specific characteristics of such a subsystem, it may be difficult to design a recovery strategy based on the traditional reconfigure and retry strategy. Algorithm reliability, that is, the ability to consistently and accurately identify a faulty unit in a complex system or subsystem, may be inadequate. The amount of dedicated software required to recover a system and to identify a faulty unit may become burdensome in a complex environment. In some cases, the system time required to perform the recovery and identification steps may be intolerable, such as in a real-time environment of a telephone office.

SUMMARY OF THE INVENTION

The above problems are partially solved and an advance in the art is achieved in a method of identifying faulty units in a computer system based on a historical analysis of system malfunctions. The system comprises at least a processing unit, a peripheral unit and an interface unit connecting the peripheral unit to the processing unit. In response to the detection of a malfunction, each system unit which detects the malfunction generates and returns an error report identifying the malfunction and the detecting unit to the processing unit. The processing unit uses the error report to generate an initial list of fault probability weights for the system units. A history list also containing fault weights for the system units as a result of prior error reports is aged by reducing its unit fault weights according to the amount of time elapsed since receipt of the last error report. A new history list is generated by combining the individual fault weights from the initial list with those contained in the aged history list. The unit having the largest combined fault weight which also has a non-zero fault weight in the initial list is selected as being faulty.

DETAILED DESCRIPTION

Figure 1:
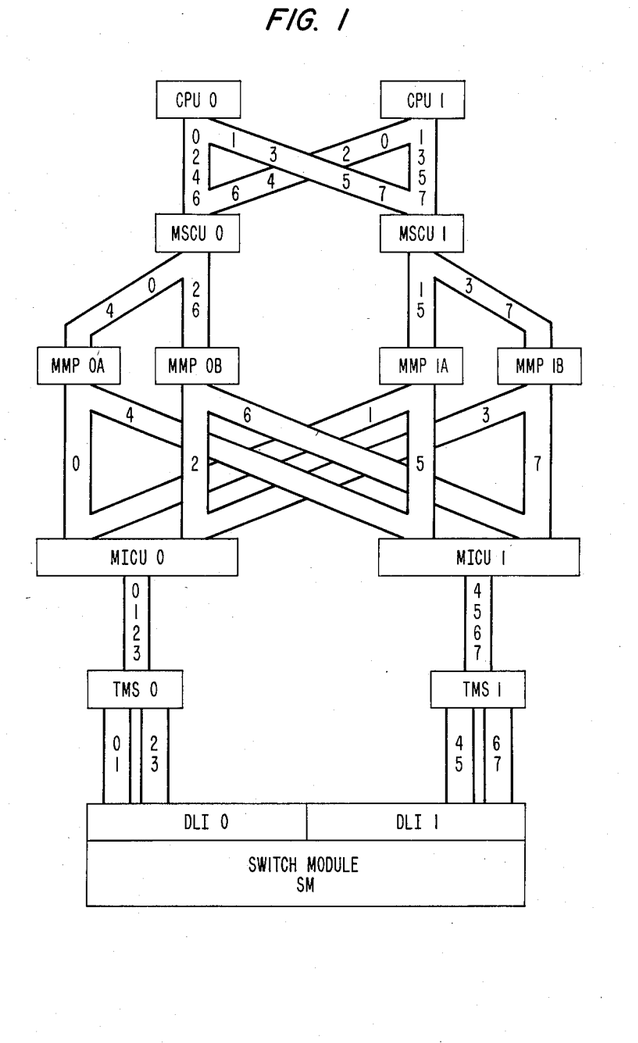
FIG. 1 shows a block diagram of an illustrative subsystem of part of a computer controlled switching system, including the various inter communication paths, shown as numbers in the channels interconnecting the units, for unit intercommunication on any given system transaction.

FIG. 1 shows a block diagram of an illustrative subsystem used to describe the invention. Specifically, the subsystem is contained in the No. 5 electronic switching system manufactured by AT&T Technologies, Inc. and described briefly in *AT&T Bell Laboratories Record,* November 1983, at page 4 and January 1984, at page 13.

The units of FIG. 1 will not be described in detail herein as this is not necessary for an understanding of the invention. Suffice it to say that the subsystem of FIG. 1 consists of duplicated central processing units (CPUs) 0 and 1, one of which is active and one standby at any given time, for controlling operations of the subsystem, at least one switch module (SM) for establishing time-division multiplexed communication connections between a plurality of incoming and outgoing lines and trunks (not shown), and a complicated and highly redundant set of interface circuits providing alternative communication paths via which the CPUs control the operations of the switch module SM.

More specifically, the illustrative interface units consist of duplicated message switch control units, MSCU 0 and MSCU 1, quadruplicated module message processors MMP 0A, MMP 0B, MMP 1A and MMP 1B, duplicated message interface units MICU 0 and MICU 1, and duplicated time multiplex switches TMS 0 and TMS 1. The interface units provide a total of eight alternative control communication paths 0 to 7 between the CPUs and the SM. These paths are shown in FIG. 1 as numerals located in the channels interconnecting the units. Thus, for example, communication paths 0, 2, 4 and 6 extend from either CPU 0 or CPU 1, whichever is active, to MSCU 0. From MSCU 0, paths 0 and 4 extend to MMP 0A, while paths 2 and 6 extend to MMP 0B. By following the other paths in FIG. 1 it is seen that paths 0, 1, 2, and 3 proceed via MICU 0 to TMS 0, where two separate physical channels connect individual path pairs 0,1 and 2,3 to the switch module SM via a dual link interface (DLI) 0. Similarly, paths 4 through 7 proceed via MICU 1 and TMS 1 to the SM via DLI 1.

Figure 2:
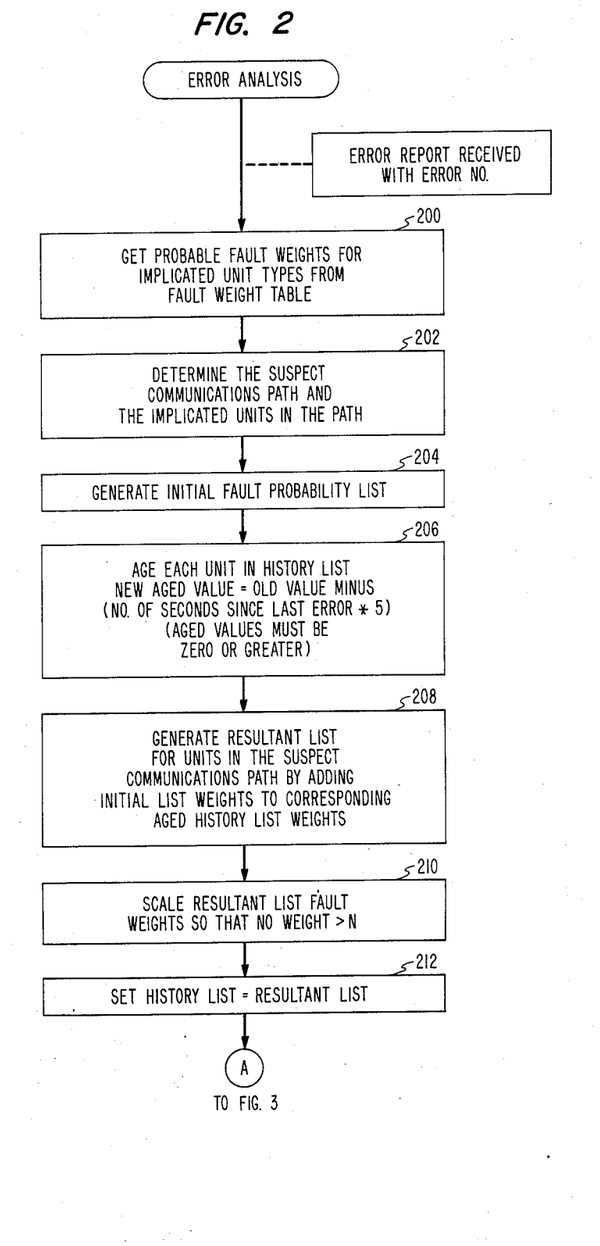
FIGS. 2 through 4 show illustrative flowcharts of the method discussed herein as implemented in software for controlling a processing unit.
Figure 3:
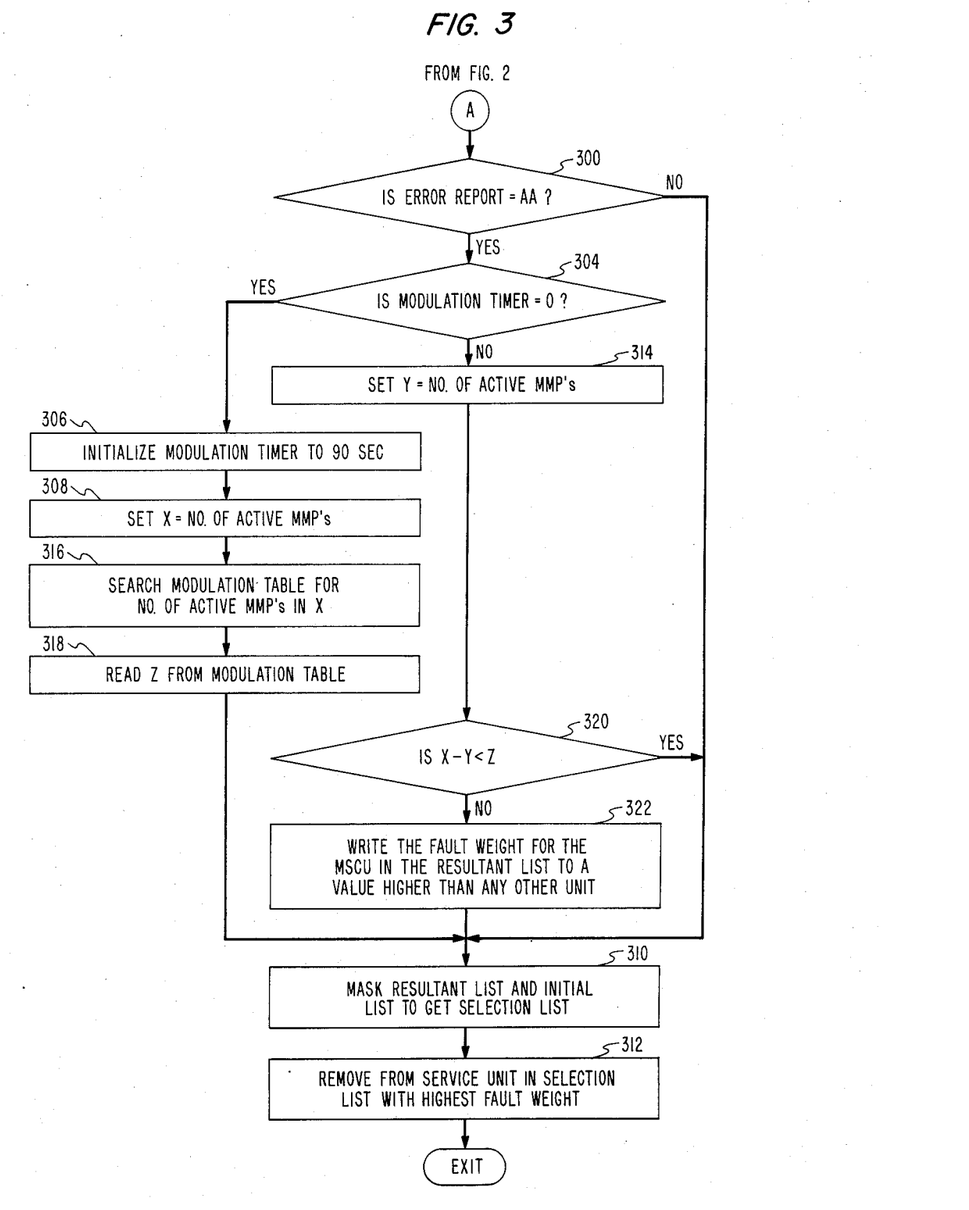

Each of the units detect various types of subsystem malfunctions while routing a control message from an active CPU to the SM. A unit detecting a malfunction generates and returns an error report having an error report number indicating the type of malfunction detected to the CPU via a separate communication channel not shown in FIG. 1. The active CPU, on receipt of an error report, initiates fault analysis and recovery by passing program control to the ERROR ANALYSIS program, whose flowcharts are shown beginning at FIG. 2 herein.

Figure 5:
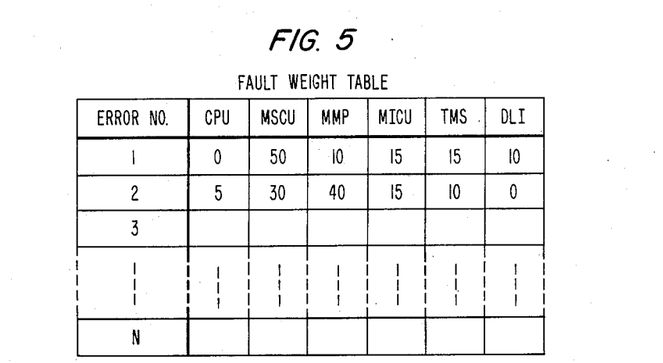
FIG. 5 shows an illustrative format of a fault weight table maintained in memory of the system and containing predefined fault probability weights for the different types of units shown in FIG. 1, based on the types of error conditions that can be reported by the individual system units.

ERROR ANALYSIS begins at step 200 by indexing into a fault weight table, shown in FIG. 5, with the number of the error message that has been received to obtain a set of probable fault weights for each type of unit in the subsystem of FIG. 1, except the SM. The fault weights in the fault weight table are predefined based on a mathematical model of the subsystem in question, taking into account the logical fault propagation dependencies of the subsystem, expected failure rates of the individual units based on their circuit structure and components, and any other factors that might characterize the failure modes of the subsystem. Thus, for example, if a fault occurs in the subsystem resulting in the generation of error message number 2 by, say MICU 0 or 1, then according to word 2 of the fault weight table, the fault likely resides in a CPU 5% of the time, in a MSCU 30% of the time, etc.

Figure 6:
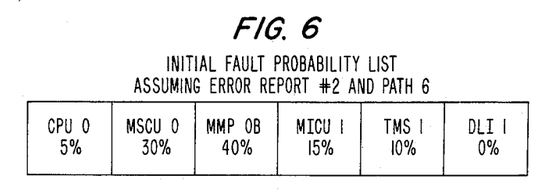
FIGS. 6 through 10 illustrate different software lists generated and analyzed by the method discussed herein for identifying faulty units in response to error reports from the subsystem units.

Once the fault weights are obtained, the specific units implicated by the error report must be ascertained. This is a function of which CPU is active and the active communications path used to transmit the control message that resulted in the generation of the error report. The active communication path being used at any given time is routinely maintained in memory by the active CPU in a conventional manner. Step 202 obtains this information and determines the implicated units in the active communications path. Thus, if error message 2 is received and step 202 determines that CPU 0 is active and that the active communications path is 6, then it is seen from FIGS. 1 and 5 that the implicated units are CPU 0, MSCU 0, MMP 0B, MICU 1 and TMS 1. Step 204 generates an initial faulty probability list, illustrated in FIG. 6, containing the implicated units with their respective fault weights from the fault weight table.

Figure 7:
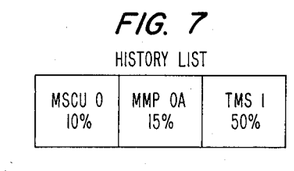
Figure 8:
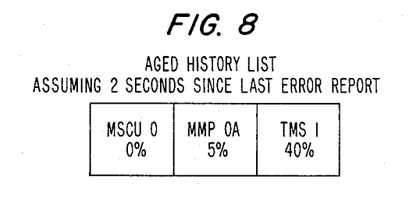

Step 206 next ages an existing error history list according to the elapsed time since the receipt of the last error report. The generation of the history list is discussed below. FIG. 7 shows an illustrative history list for purposes of discussion. For this example, the history list is assumed to contain the following fault weights before aging: MSCU 0–10%, MMP 0A–15%, TMS 1–50%. In the preferred illustrative embodiment, aging of the history list is performed by subtracting a value from each of the fault weights in the history list equal to the number five multiplied by the number of seconds elapsed since the last error report (aged fault weight=current weight−5 * no. of elapsed seconds). Any desired algorithm may, however, be used. If the result for any aged fault weight is less than zero, that result is set to zero rather than to a negative number. FIG. 8 shows the aged history list for this example, assuming that two seconds have elapsed between the previous error report and the current report. MSCU 0, MMP 0A and TMS 1 have aged fault weights of 0, 5 and 40 percent, respectively.

Figure 9:
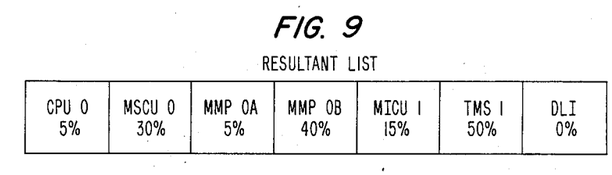

Step 208 generates a resultant list of implicated units by adding the fault weights for the individual units from the initial list to the respective weights now present in the aged history list. A resultant list in the present example is shown in FIG. 9. By examining the initial list in FIG. 6 and the aged history list in FIG. 8, it is seen that the resultant list contains the following units with the following fault weights: CPU 0–5%, MSCU 0–30%, MMP 0A—5% MMP 0B–40%, MICU 1–15%, TMS 1–50%, DLI 1–0%. To prevent possible aberrations in the prediction of a faulty unit because of unforeseen circumstances that might otherwise result in excessively large fault weights in the resultant list, the weights in the resultant list are scaled by step 210 so that no weights are larger than a preselected value N. In the preferred embodiment, the scaling is done by merely reducing any resultant fault weight greater than N to N.

Figure 11:
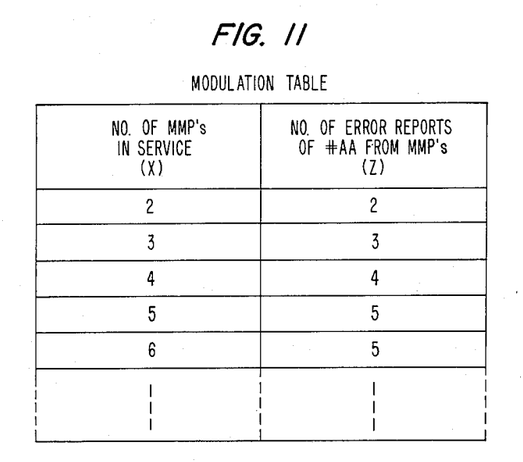
FIG. 11 shows an illustrative modulation table containing predefined information used to refine the accuracy of fault unit identification in certain cases in which a threshold of error reports from a given type of unit may implicate another unit type as being faulty.

In any given system, there may be certain error reports that, when generated frequently by a particular type of unit, implicate another unit not otherwise implicated by such an error report. This is the case in the specific subsystem of FIG. 1 for a family of error reports generated by a MMP and identified for discussion here as AA, which at some point implicate a MSCU. A modulation table, illustratively shown in FIG. 11, is used to determine the point at which an MSCU is implicated. The modulation table consists of several words, each of which contain a search parameter X which represents the number of MMPs in service at the beginning of a modulation interval and a second parameter Z indicating a threshold level related to the number of error reports AA generated by the MMP. More specifically, the threshold level is directly related to the difference between the number of active MMPs present at the beginning of a modulation interval and the number of active MMPs present at the time of generation of subsequent error reports AA during the modulation interval. The threshold can be viewed in these terms because, in general, a MMP is removed from service in response to a fixed number of successive error reports AA. Receipt of a first report AA initiates the modulation interval. In response to receipt of an error report AA during the modulation interval, the analysis program determines the number of presently active MMPs and then it determines if the threshold level has been exceeded. If so, it is concluded that the MSCU communicating with the MMP generating the last error report AA may be faulty.

In more detail now, step 300 determines if the received error report is number AA. If not, the modulation process is bypassed. If so, a modulation timer is tested for the value zero by step 304. The modulation timer defines the modulation interval during which the threshold level must occur to implicate an MSCU. If the content of the modulation timer is zero, step 306 initializes the timer to an illustrative 90 second interval to begin the modulation interval. Step 308 saves the number of MMPs active at this time in a variable X. Step 316 searches the X parameter of the modulation table in FIG. 11 for an entry containing a number equal to the number of presently active MMPs. When this is found, step 318 reads the threshold level contained in the second entry of the table and sets variable Z to this value.

Step 310 now proceeds with normal analysis by masking the resultant and initial lists to get a final selection list from which a most probable faulty unit is selected. Masking in this context means preserving in the selection list the fault weights contained in the resultant list for all units that are present in both the resultant and initial lists.

Figure 10:
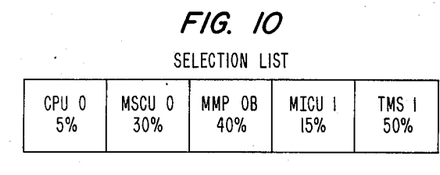

An illustrative selection list generated by step 310 in the present example is shown in FIG. 10. The selection list contains entries for CPU 0, MSCU 0, MMP 0B, MICU 1 and TMS 1, since these units have non-zero fault weights in both the initial and resultant lists. The fault weights in the selection list for these units are taken from the resultant list.

The unit in the selection list having the largest fault weight is presumed to be a faulty unit. Accordingly, step 312 determines this unit, which is TMS 1 in the present example, removes it from service and schedules additional diagnostic tests to be executed on the unit to pinpoint the location of the fault within the unit.

To return to the discussion of the modulation analysis, assume that after TMS 1 is removed from service in this example error report number AA is again received by the active CPU. Step 304 determines if the modulation timer initially set to an illustrative 90 seconds has expired. If so, the timer is reinitialized by step 306 and analysis with respect to this error report continues as already discussed. On the other hand, if the timer is not equal to 0, then an error report AA from a MMP was received in the recent past, thereby possibly implicating a MSCU as faulty. To determine if this is so, step 314 determines the number of presently active MMPs and sets a variable Y to this value. Step 320 determines if the number X of active MMPs present when the modulation timer was last initialized (see step 308) minus the number of presently active MMPs Y is less than the number Z contained in the second entry of the modulation table. If this is true, a MSCU is not implicated. If $X-Y>=Z$, however, step 322 forces a fault weight in the resultant list for the MSCU to a value guaranteed to cause its implication as a faulty unit.

Figure 4:
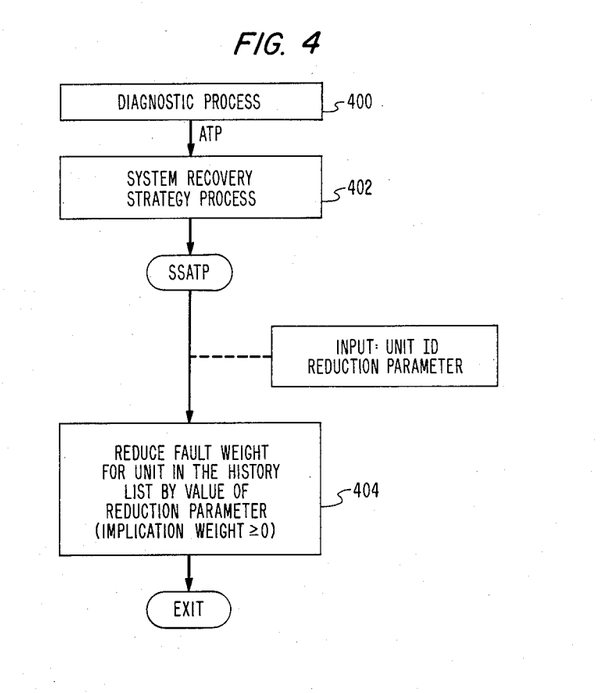

Because the above-described fault analysis process is based on probabilities initially determined by human input, it is possible that an erroneous selection of a fault unit will be made in any given instance. A strategy illustrated in FIG. 4 is provided to minimize the effects of erroneous fault unit selection and, in such a case, to help assure that eventually the correct fault unit will be found. A diagnostic process executed on a unit declared as faulty by the above-described method is illustrated by step 400. The results of a diagnostic process are a confirmation of a unit fault or an all tests pass (ATP) condition. This latter event may suggest an incorrect selection by the fault analysis process. When the ATP condition is found by the diagnostic process, a system recovery strategy process illustrated by step 402 is executed. If the unit diagnosed is contained in the subsystem discussed herein, the system recovery strategy process enters SSATP, also shown in FIG. 4, with a unit identification and a unit fault weight reduction parameter as input parameters. As a result, step 404 reduces the fault weight for the unit in the history list by the value of the reduction parameter, but not to a resulting value less than zero. This action lessens the historical fault implication attributed to the identified unit for purposes of the next error report.

It is to be understood that the above-described arrangement is merely illustrative of the application of the principles of the invention and that other arrangements may be devised by those skilled in the art without departing from the spirit and scope of the invention.

What is claimed is:

1. In a computer system comprising a processing unit (CPU), a peripheral unit (SM), and at least one interface unit (MSCU, MMP, MICU, TMS, DLI) connecting the processing unit to the peripheral unit, and in which prescribed ones of the units include means for generating and returning error report messages to the processing unit in response to detections of prescribed error conditions, a software implemented method for controlling the processing unit to identify a faulty system unit, said method comprising the steps of in response to receipt of an error report identifying a predefined error condition and one of the prescribed units generating the error report, generating an initial list of predetermined fault probability weights for the system units, aging a history list containing fault weights generated by the next-mentioned step as a result of receipt of a last error report by reducing the fault weights for each unit in the history list according to a first prescribed algorithm based on elapsed time since receipt of the last error report, generating a new history list by individually combining the fault weights in the initial list with the fault weights in the aged history list for each unit according to a second prescribed algorithm, and selecting as faulty unit that unit having the largest fault weight in the new history list that also has a non-zero fault weight in the initial list.

2. The method of claim 1 wherein prescribed ones of the units are replicated and reconfigurable to form a plurality of alternative communication paths between the processing unit and the peripheral unit and the step of generating an initial probability weight list further comprises the steps of identifying a suspect one of the communication paths containing the specific unit that generated the error report, identifying all of the remaining individual units in the suspect path, and assigning individual predetermined fault probability weights to each of the units in the suspect path based on the type of the error report received.

3. The method of claim 1 wherein the step of aging the history list further comprises the step of reducing the fault probability weight for each unit in the history list by an amount equal to a prescribed constant multiplied by a representation of the time that has elapsed since receipt of the last error report.

4. The invention of claim 3 in which said representation of elapsed time is the number of seconds elapsed since receipt of the last error report.

5. The method of claim 1 wherein the step of generating a new history list further comprises the step of adding the corresponding weights for each unit from the present history list and the initial list.

6. The invention of claim 1 wherein the step of selecting a fault unit further comprises the step of generating a selection list including only units common to both the initial list and the new history list and containing fault weights for the units contained therein taken from the new history list.

7. The invention of claim 1 further comprising the steps of in response to a first error report of a prescribed type generated by a predetermined one of the units, activating a prescribed timing interval, and in response to another error report of the prescribed type generated by the predetermined one of the units during the prescribed timing interval, selecting a prespecified another one of the system units as faulty if a prescribed threshold is exceeded.

8. The invention of claim 7 wherein the predetermined one of the units is a member of a replicated set of the units and the prescribed threshold is established by the step of determining the difference between the number of units in the replicated set of units that are available for service at the time of receipt of the first error report and the number of units in the replicated set of units that are available for service at the time of receipt of said another one of the error reports of the prescribed type.

9. The invention of claim 8 wherein the step of selecting a prespecified another one of the system units as faulty further comprises the step of selecting a unit that interfaces with the set of replicated units.

10. The invention of claim 9 wherein the prescribed threshold is further established by the step of comparing said difference to a threshold number obtained from a prestored table, said threshold number being obtained by searching the table for a first entry containing a number representing the number of units in the replicated set of units that are available for service at the time of receipt of the first error report of the prescribed type, and comparing said difference to a number contained in a second entry of the prestored table associated with the first entry.

11. The invention of claim 1 further comprising the steps of performing diagnostic tests on the unit selected as faulty to confirm the fault condition, and in response to an all test pass condition of the diagnostic tests, reducing the fault weight for the selected unit in the history list by a prescribed amount, but to an amount not less than zero.

12. In a computer system comprising replicated processing units, a peripheral unit, and at least one set of replicated interface units connecting the processing units to the peripheral unit via alternative communication paths, and in which each unit includes means for detecting a plurality of different error conditions signifying fault conditions and for generating and returning unique error reports to the processing unit in response to the detection of the different error conditions, a software implemented method for identifying a faulty unit, said method comprising the steps of in response to a receipt of an error report of a given type, determining the specific unit generating the error report, determining an active communication path containing the specific unit, determining all other units contained in the active communication path, obtaining predefined probable fault weights for each type of unit in the system based on the error report type, generating an initial list of suspect units by assigning the predefined probable fault weights for each type of system unit to the corresponding units in the active communication path, obtaining an existing history list containing present fault weights for each of the system units, aging the history list by reducing the fault weights for each unit according to a second prescribed algorithm based on time elapsed since receipt of a last error report, generating a new history list by logically combining the initial list and the present history list in a predetermined manner, and selecting as a fault unit that unit having the largest fault weight in the new history list that also has a non-zero fault weight in the initial list.

* * * * *